United States Patent
Han

(10) Patent No.: US 12,502,046 B2
(45) Date of Patent: Dec. 23, 2025

(54) METHOD AND DEVICE OF CHARGING CONTROL, STORAGE MEDIUM, AND CLEANING ROBOT

(71) Applicant: Beijing Roborock Technology Co., Ltd., Beijing (CN)

(72) Inventor: Xinyu Han, Beijing (CN)

(73) Assignee: Beijing Roborock Technology Co., Ltd., Beijing (CN)

(*) Notice: Subject to any disclaimer, the term of this patent is extended or adjusted under 35 U.S.C. 154(b) by 602 days.

(21) Appl. No.: 17/799,065

(22) PCT Filed: Jan. 11, 2021

(86) PCT No.: PCT/CN2021/071077
§ 371 (c)(1),
(2) Date: Aug. 11, 2022

(87) PCT Pub. No.: WO2021/203789
PCT Pub. Date: Oct. 14, 2021

(65) Prior Publication Data
US 2023/0067501 A1     Mar. 2, 2023

(30) Foreign Application Priority Data

Apr. 7, 2020  (CN) .......................... 202010266733.5

(51) Int. Cl.
*H01M 10/44* (2006.01)
*A47L 9/28* (2006.01)
*H01M 10/46* (2006.01)
*H02J 7/00* (2006.01)

(52) U.S. Cl.
CPC .......... *A47L 9/2873* (2013.01); *H02J 7/0036* (2013.01); *H02J 7/0044* (2013.01); *A47L 2201/022* (2013.01)

(58) Field of Classification Search
CPC .. H02J 7/00036; H02J 7/00045; H02J 7/0045; H02J 7/0047; H02J 7/0036; H02J 7/0044; A47L 9/2873; A47L 9/2852
USPC .......................... 320/107, 114, 115, 132, 148
See application file for complete search history.

(56) References Cited

U.S. PATENT DOCUMENTS

| | | | |
|---|---|---|---|
| 2013/0221908 A1 | 8/2013 | Tang | |
| 2015/0289741 A1* | 10/2015 | Konandreas | A47L 5/14 |
| | | | 15/319 |
| 2015/0375395 A1 | 12/2015 | Kwon et al. | |
| 2017/0332853 A1* | 11/2017 | Nam | A47L 9/009 |

FOREIGN PATENT DOCUMENTS

| | | |
|---|---|---|
| CN | 102407522 A | 4/2012 |
| CN | 106264342 A | 1/2017 |
| CN | 206840109 U | 1/2018 |
| CN | 107997694 A | 5/2018 |
| CN | 108011253 A | 5/2018 |
| CN | 108521149 A | 9/2018 |
| CN | 111446757 A | 7/2020 |
| CN | 111446757 B | 4/2022 |
| JP | 2006-034432 A | 2/2006 |
| JP | 2006-231448 A | 9/2006 |
| JP | 2017064066 A | 4/2017 |
| KR | 10-2010-0100518 A | 9/2010 |

OTHER PUBLICATIONS

Machine translation CN102407522A (Mar. 26, 2014) (Year: 2014).*
Office Action issued in corresponding Chinese Patent Application No. 202010266733.5 dated Apr. 2, 2021.
International Search Report issued in corresponding International Patent Application No. PCT/CN2021/071077 dated Mar. 30, 2021.
Extended European Search Report issued in the corresponding Application No. 21784717.7, dated Apr. 15, 2024.
Office Action issued in corresponding Chinese Patent Application No. 202210300404.7, dated Apr. 2, 2025.

* cited by examiner

*Primary Examiner* — Edward Tso
(74) *Attorney, Agent, or Firm* — Morgan, Lewis & Bockius LLP

(57) ABSTRACT

A charging control method, applicable to a cleaning robot, includes: detecting a charging status of the cleaning robot; braking the cleaning robot in response to detecting that the cleaning robot is being charged, so as to lock a drive wheel of the cleaning robot; monitoring an unlocking trigger operation; and unlocking the cleaning robot in response to detecting the unlocking trigger operation.

12 Claims, 2 Drawing Sheets

METHOD AND DEVICE OF CHARGING CONTROL, STORAGE MEDIUM, AND CLEANING ROBOT

CROSS-REFERENCE TO RELATED APPLICATION

This application is a US national phase of a PCT application under PCT/CN2021/071077, which claims priority to Chinese Patent Application No. 202010266733.5, filed on Apr. 7, 2020, which is incorporated herein by reference in its entirety.

TECHNICAL FIELD

The present disclosure relates to the field of cleaning robot control technologies, and in particular, to a charging control method and a charging control device, a storage medium, and a cleaning robot.

BACKGROUND

With the development of robotics, robots have already replaced human beings to do some indoor jobs. For example, automatic cleaning apparatuses (for example, sweeping robots) are gradually increasingly known and used.

At present, during charging of an automatic cleaning apparatus, the automatic cleaning apparatus may be disengaged from a charging dock during charging due to an incorrect positioning in docking or another problem, so that the automatic cleaning apparatus cannot be charged normally, and subsequent cleaning is affected, thereby deteriorating user experience.

SUMMARY

In view of the foregoing problem, the present disclosure is proposed to provide a charging control method and a charging control device, a storage medium, and a cleaning robot that can overcome the foregoing problem or at least partly resolve the foregoing problem.

According to an aspect of the present disclosure, a charging control method is provided. The charging control method is applicable to a cleaning robot, and includes:
 detecting a charging status of the cleaning robot; and
 braking the cleaning robot in response to detecting that the cleaning robot is being charged, so as to lock a drive wheel of the cleaning robot.

In some embodiments, after locking the drive wheel of the cleaning robot, the method further includes:
 monitoring a preset unlocking trigger operation; and
 unlocking the cleaning robot in response to detecting the unlocking trigger operation, so as to unlock the drive wheel of the cleaning robot.

In some embodiments, monitoring the preset unlocking trigger operation includes:
 monitoring a status of the drive wheel of the cleaning robot; and
 determining that the unlocking trigger operation is detected in response to detecting rotation of the drive wheel of the cleaning robot.

In some embodiments, monitoring the preset unlocking trigger operation includes:
 monitoring a charging process of the cleaning robot; and
 determining that the unlocking trigger operation is detected in response to detecting that charging of the cleaning robot is completed.

In some embodiments, monitoring the preset unlocking trigger operation includes:
 monitoring an operation instruction received by the cleaning robot; and
 determining that the unlocking trigger operation is detected in response to detecting that the cleaning robot receives an instruction used to instruct to start a cleaning mode.

In some embodiments, after unlocking the drive wheel of the cleaning robot, the method further includes:
 determining whether charging of the cleaning robot is completed; and
 docking the cleaning robot into the charging dock when charging of the cleaning robot is not completed.

In addition, the present disclosure further provides a computer-readable storage medium. The computer-readable storage medium stores a computer program, and when the program is executed by a processor, operations of the foregoing method are implemented.

In addition, the present disclosure further provides a cleaning robot. The cleaning robot includes a memory, a processor, and a computer program that is stored in the memory and that is executable by the processor, wherein when the program is executed by the processor, operations of the foregoing method are implemented.

The foregoing descriptions are merely a summary of technical solutions of the present disclosure. For a clearer understanding of the technology in the present disclosure and therefore implementation according to the contents of this specification, the following specifically describes the embodiments of the present disclosure, to more explicitly explain the foregoing and other objects, features, and advantages of the present disclosure.

BRIEF DESCRIPTION OF DRAWINGS

With detailed descriptions of the following exemplary embodiments of this specification, various other advantages and benefits are clearer to one of ordinary skill in the art. The accompanying drawings merely illustrate objectives of the exemplary embodiments, but cannot be considered as a limit to the present disclosure. In addition, in all the accompanying drawings, use of the same reference numeral indicates the same component or part. In the accompanying drawings.

DESCRIPTION OF EMBODIMENTS

The following describes exemplary embodiments of the present disclosure with more details with reference to the accompanying drawings. Although the exemplary embodiments of the present disclosure are illustrated in the accompanying drawings, it should be understood that the present disclosure may be implemented in various manners and should not be limited to the embodiments described herein. On the contrary, the embodiments are provided for the present disclosure to be understood more thoroughly, and for the scope of the present disclosure to be fully understood by one of ordinary skill in the art.

Unless defined otherwise, all terms used herein (including technical terms and scientific terms) have the same meanings as are generally understood by one of ordinary skill in the art to which the present disclosure pertains. Terms such as those defined in a general dictionary should be understood as having the same meanings as they have in the context of the prior art, and unless specifically defined, the terms do not bear meanings that are idealistic or too formal.

A cleaning robot to which technical solutions of the present disclosure are applicable may be (but is not limited to) an automatic cleaning apparatus, for example, a sweeping robot, a mopping robot, or an integrated sweeping-mopping robot, and the cleaning robot may include a device body, a sensing system, a control system, a drive system, a cleaning system, an energy system, and a human-machine interaction system.

Figure 1:
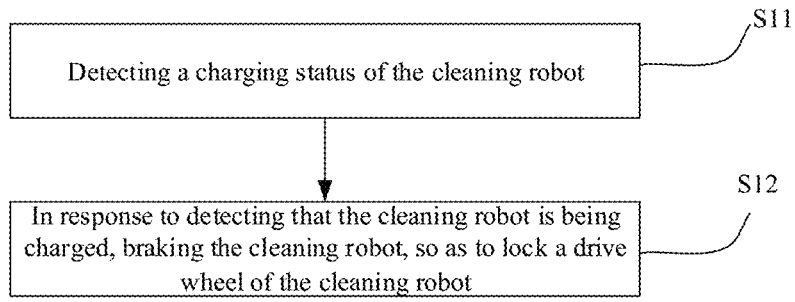
FIG. 1 is a flowchart of a charging control method according to an embodiment of the present disclosure.

FIG. 1 schematically illustrates a flowchart of a charging control method according to an embodiment of the present disclosure. Referring to FIG. 1, the charging control method according to this embodiment of the present disclosure is applicable to a cleaning robot, and includes:

Step S11: Detecting a charging status of the cleaning robot.

Step S12: Braking the cleaning robot in response to detecting that the cleaning robot is being charged, so as to lock a drive wheel of the cleaning robot.

In actual application, the cleaning robot is equipped with an automatic charging system. When in operation, the cleaning robot is automatically docked into a charging dock and gets charged when power is running out or when cleaning operation is completed. However, during charging, an automatic cleaning device may be disengaged from the charging dock accidentally during charging due to an incorrect positioning in docking or another problem, so that the cleaning robot cannot be charged properly. Therefore, in the technical solutions of the present disclosure, a charging status of the cleaning robot is monitored in real time, and the cleaning robot is braked (for example, electromagnetically) in response to detecting that the cleaning robot is being charged, so as to lock a drive wheel of the cleaning robot (for example, electromagnetically), thereby preventing the cleaning robot from being accidentally disengaged from the charging dock due to an external force or another factor.

A specific implementation of braking the cleaning robot is to control a motor of the drive wheel to be braked with a specific torque and lock the drive wheel.

According to the charging control method provided in this embodiment of the present disclosure, the cleaning robot is braked when being charged, so as to lock the drive wheel of the cleaning robot, so that accidental disengagement from the charging dock due to incorrect positioning in docking or the like is prevented during charging, and it is guaranteed that charging of the cleaning robot can be completed properly and then the cleaning robot can perform its subsequent cleaning operation smoothly, which improves user experience.

Figure 2:
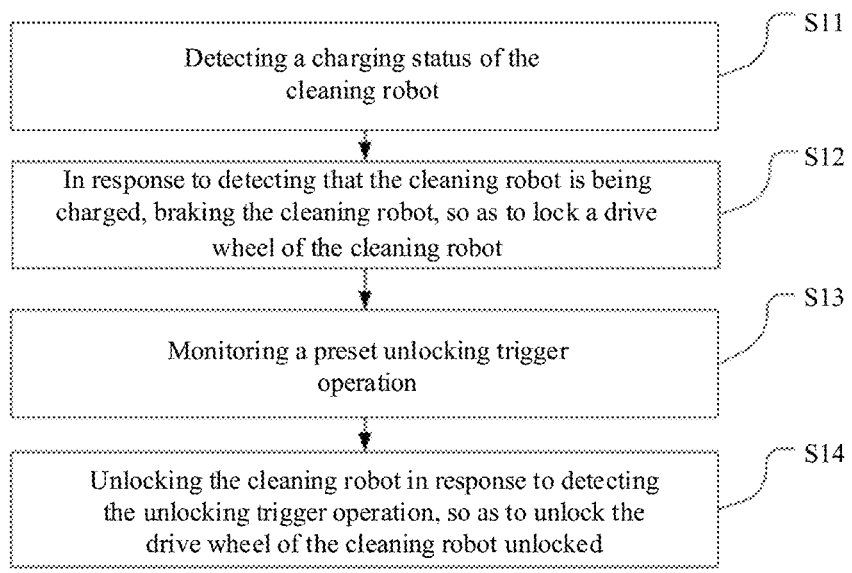
FIG. 2 is a flowchart of a charging control method according to another embodiment of the present disclosure.

FIG. 2 schematically illustrates a flowchart of a charging control method according to another embodiment of the present disclosure. Referring to FIG. 2, the charging control method according to this embodiment of the present disclosure is applicable to a cleaning robot, and includes:

Step S11: Detecting a charging status of the cleaning robot.

Step S12: Braking the cleaning robot in response to detecting that the cleaning robot is being charged, so as to lock a drive wheel of the cleaning robot.

After locking the drive wheel of the cleaning robot, step S13 is performed.

Step S13: Monitoring a preset unlocking trigger operation.

In response to detecting the unlocking trigger operation, step S14 is performed; otherwise, the locked state of the drive wheel of the cleaning robot is maintained until charging is finished.

Step S14: unlocking the cleaning robot, so as to unlock the drive wheel of the cleaning robot.

In this embodiment, after locking the drive wheel of the cleaning robot, the drive wheel of the cleaning robot may be unlocked due to some trigger operations. For example, the cleaning robot may be pushed by an external force, the cleaning robot has completed charging and may receive an instruction of "begin cleaning", and the like. Therefore, the preset unlocking trigger operation is required to be monitored, and the cleaning robot is unlocked in response to detecting the foregoing unlocking trigger operation, so as to unlock the drive wheel of the cleaning robot.

In an embodiment, monitoring the preset unlocking trigger operation includes monitoring the status of the drive wheel of the cleaning robot and determining that the unlocking trigger operation is monitored in response to detecting rotation of the drive wheel of the cleaning robot.

In this embodiment, when the cleaning robot is pushed by an external force, the drive wheel rotates under action of the external force, and the motor for the drive wheel electrically unlocks the drive wheel actively. An electromagnetic brake machine of the drive wheel rotates, passively cuts magnetic flux, and generates a current. Thus, after detecting an abnormalcy in the current, a control chip of the cleaning robot unlocks the electromagnetic brake of the drive wheel actively.

In this embodiment of the present disclosure, after the drive wheel of the cleaning robot is unlocked, the method further includes:

determining whether charging of the cleaning robot is completed; and in a case in which charging of the cleaning robot is not completed, docking the cleaning robot into the charging dock for charging.

Further, in response to determining that charging of the cleaning robot is completed, a cleaning action, corresponding to an instruction that has been received and used to instruct to start a cleaning mode, is performed, or a working instruction awaits being issued.

In this embodiment, after actively unlocking the drive wheel, the cleaning robot determines whether the reason to unlock the cleaning robot is that charging of the robot has been completed normally, and in response to determining that charging of the cleaning robot is not completed, the cleaning robot searches the charging dock again until the drive wheel is locked again after normal charging, to ensure that subsequent cleaning operation is performed smoothly, thereby further improving user experience. And the cleaning robot waits to receive a working instruction in a case in which charging of the cleaning robot is completed, so as to complete a new cleaning task. Or if an instruction of begin cleaning mode has been received, the cleaning robot performs a cleaning operation corresponding to the instruction that has been received and is used to instruct to start the cleaning mode.

In an embodiment, monitoring the preset unlocking trigger operation includes monitoring a charging process of the cleaning robot, and determining that the unlock trigger operation is detected in response to detecting that charging of the cleaning robot is completed.

In an embodiment, monitoring the preset unlocking trigger operation includes monitoring an operation instruction received by the cleaning robot, and determining that the unlock trigger operation is monitored in response to detecting that the cleaning robot receives an instruction used to instruct to start a cleaning mode.

In this embodiment, when charging of the cleaning robot is completed or the cleaning robot receives an instruction used to instruct to start the cleaning mode, for example, an instruction of "begin cleaning", the control chip of the cleaning robot unlocks the electromagnetic brake of the drive wheel actively.

For brief description, the method embodiments are described as a combination of a series of actions, but it should be known by one of ordinary skill in the art that the embodiments of the present disclosure are not limited by a sequence of the described actions. Therefore, according to the embodiments of the present disclosure, some steps may be performed simultaneously or in another sequence. In addition, it should be further known by one of ordinary skill in the art that all the embodiments described in this specification are preferred embodiments, and not all the described actions are necessary for the embodiments of the present disclosure.

Figure 3:
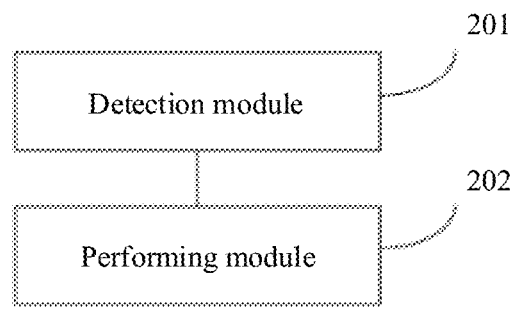
FIG. 3 is a structural block diagram of a charging control device according to an embodiment of the present disclosure.

Exemplarily, FIG. 3 is a schematic structural diagram of a charging control device according to an embodiment of the present disclosure. Referring to FIG. 3, the charging control device according to this embodiment of the present disclosure includes a detection module 201 and a performing module 202.

The detection module 201 is configured to detect a charging status of a cleaning robot.

The performing module 202 is configured to brake the cleaning robot in response to detecting that the cleaning robot is being charged, so as to lock a drive wheel of the cleaning robot.

According to the charging control device provided in this embodiment of the present disclosure, when the cleaning robot is being charged, the performing module 202 can brake the cleaning robot so as to lock the drive wheel of the cleaning robot electromagnetically. Thus, accidental disengagement from a charging dock due to an incorrect positioning in docking or another problem is prevented during charging, and it is guaranteed that charging of the cleaning robot can be completed properly and the cleaning robot can perform subsequent cleaning operation smoothly, thereby improving user experience.

Figure 4:
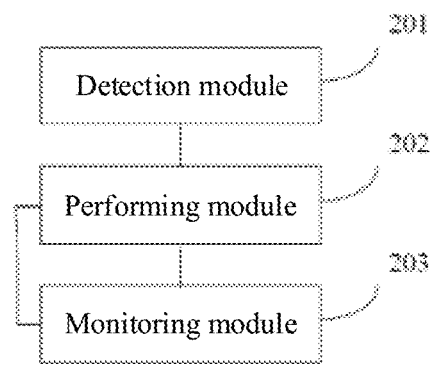
FIG. 4 is a structural block diagram of a charging control device according to another embodiment of the present disclosure.

FIG. 4 schematically illustrates a schematic structural diagram of a charging control device according to another embodiment of the present disclosure. Referring to FIG. 3, the charging control device according to this embodiment of the present disclosure includes a detection module 201, a performing module 202, and a monitoring module 203.

The detection module 201 is configured to detect a charging status of the cleaning robot.

The performing module 202 is configured to: brake the cleaning robot in response to detecting that the cleaning robot is being charged, so as to lock a drive wheel of the cleaning robot.

The monitoring module 203 is configured to monitor a preset unlocking trigger operation after the drive wheel of the cleaning robot locked.

Further, the performing module 202 is further configured to unlock, in response to the unlocking trigger operation detected by the monitoring module 203, the cleaning robot so as to unlock the drive wheel of the cleaning robot.

In an embodiment of the present disclosure, the monitoring module 203 is configured to monitor a status of the drive wheel of the cleaning robot, and to determine that an unlocking trigger operation is detected in response to detecting rotation of the drive wheel of the cleaning robot.

In this embodiment of the present disclosure, the charging control apparatus further includes a determining module which is not illustrated in the accompany drawings.

The determining module is configured to: determine whether charging of the cleaning robot is completed after the drive wheel of the cleaning robot is unlocked.

Correspondingly, the performing module 202 is further configured to dock the cleaning robot into the charging dock in response to determining by the determining module that charging of the cleaning robot is not completed, and brake the cleaning robot in response to detecting that the cleaning robot is being charged.

Further, in response to determining by the determining module that charging of the cleaning robot is completed, the performing module 202 is configured to perform a corresponding cleaning action according to an instruction that has been received and is used to instruct to start a cleaning mode, or wait a working instruction to be issued.

In an embodiment of the present disclosure, the monitoring module 203 is configured to monitor a charging process of the cleaning robot, and to determine that the unlocking trigger operation is detected in response to detecting that charging of the cleaning robot is completed.

In an embodiment of the present disclosure, the monitoring module 203 is configured to monitor an operation instruction received by the cleaning robot, and determine that the unlocking trigger operation is detected in response to detecting that the cleaning robot receives an instruction used to instruct to start a cleaning mode.

The device embodiment is substantially similar to the method embodiment, so that the device embodiment is described relatively briefly, and relevant contents can be referred a part of descriptions in the method embodiment.

The device embodiment described above is merely exemplary. The foregoing units described as separate components may be or may not be physically separate. The components displayed as units may be or may not be physical units; that is, they may be located at one place or may be distributed on a plurality of network units. Some or all of the modules can be selected based on actual requirements to achieve objectives of the solutions of the embodiments. One of ordinary skill in the art can understand and implement the embodiments without any creative efforts.

According to the charging control method and the charging control device provided in the embodiments of the present disclosure, when the cleaning robot being charged, the cleaning robot is braked, so as to lock the drive wheel of the cleaning robot electromagnetically, so that accidental disengagement from the charging dock due to incorrectly positioning in docking or another problem is prevented during charging, and it is guaranteed that charging of the cleaning robot can be completed properly and then the cleaning robot can perform cleaning operation smoothly, thereby improving user experience.

In addition, an embodiment of the present disclosure further provides a computer-readable storage medium. The computer-readable storage medium stores a computer program, and when the computer program is executed by a processor, operations of the foregoing method are implemented.

In this embodiment, when modules or units integrated in the charging control device are implemented as a software functional unit and sold or used as an independent product, the integrated module/unit of the charging control device may be stored in a computer-readable storage medium. Based on such an understanding, all or some procedures of the method embodiment of the present disclosure may be implemented by a computer program instructing related hardware. The computer program may be stored in a computer-readable storage medium, and when the computer program is executed by a processor, operations of the foregoing various method embodiments can be performed. The computer program includes computer program code, and the computer program code may be in a form of source code, object code, or an executable file, or some intermediate forms. The computer-readable medium may include any entity or apparatus that can carry the computer program code, a recording medium, a USB flash memory, a mobile hard disk, a magnetic disk, a compact disc, a computer storage device, a read-only memory (ROM), a random access memory (RAM), a power line communication signal, a telecommunications signal, a software distribution medium, and the like. It should be noted that content included in the computer-readable medium may be properly added or omitted according to requirements on lawmaking and patent practice in the jurisdiction. For example, in some jurisdictions, according to lawmaking and patent practice requirements, the computer-readable medium does not include a power line communication signal and a telecommunications signal.

Figure 5:
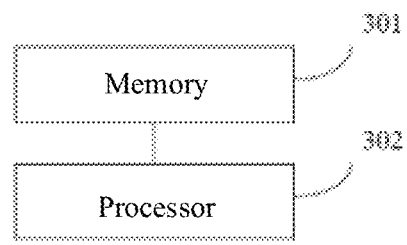
FIG. 5 is a schematic diagram of a cleaning robot according to an embodiment of the present disclosure.

FIG. 5 is a schematic diagram of a cleaning robot according to an embodiment of the present disclosure. The cleaning robot according to the embodiment of the present disclosure includes a memory 301, a processor 302, and a computer program that is stored in the memory 301 and that is executable by the processor 302, wherein when the processor 302 executes the computer program, steps, for example, operations as illustrated in FIG. 1 or FIG. 2, of the foregoing various charging control method embodiments are performed. Alternatively, when executing the computer program, the processor 302 executes functions of various modules/units, for example, the detection module 201 and the performing module 202 illustrated in FIG. 3, in the foregoing various charging control device embodiments.

For example, the computer program may be divided into one or more modules/units. The one or more modules/units are stored in the memory, and are executed by the processor, to implement the present disclosure. The one or more modules/units may be a series of computer program instruction segments that can fulfill a particular function, and the instruction segments are used to describe a process of the computer program executed in the charging control apparatus. For example, the computer program may be divided into the detection module 201 and the performing module 202.

One of ordinary skill in the art should understand that the schematic diagram of FIG. 5 is merely an example of the cleaning robot, and cannot be construed as a limitation to the cleaning robot, and the cleaning robot may include more or fewer components than those illustrated in the drawing, or combine some components, or have different components. For example, the cleaning robot may further include an input/output device, a network access device, a bus, and the like.

The processor may be a central processing unit (CPU), or may be another general-purpose processor, a digital signal processor (DSP), an application-specific integrated circuit (ASIC), a field programmable gate array (FPGA), another programmable logic device, a discrete gate or a transistor logic device, a discrete hardware component, or the like. The general-purpose processor may be a microprocessor, or the processor may be any conventional processor. The processor is a control center of the cleaning robot, and is connected to various parts of the whole cleaning robot through various interfaces and lines.

The memory may be configured to store the computer program and/or module, the processor runs or executes the computer program and/or module stored in the memory and invokes data stored in the memory, to implement various functions of the cleaning robot. The memory may mainly include a program storage area and a data storage area. The program storage area may store an operating system, an application for at least one function (for example, a sound play function or an image play function), and the like. The data storage area may store data (for example, audio data or an address book) created based on use of the mobile phone or the like. In addition, the memory may include a high-speed random access memory, or may include a nonvolatile memory, for example, a hard disk, internal storage, a plug-in hard disk, a smart media card (SMC), a secure digital (SD) card, a flash card, at least one of magnetic disk storage device, a flash memory, or another volatile solid-state storage device.

One of ordinary skill in the art should understand that, although some embodiments herein include some features but not other features included in another embodiment, a combination of features in different embodiments means that the combination falls within the scope of the present disclosure and forms a different embodiment. For example, in the appended claims, any one of the embodiments that claim protection can be used with any manner of combination.

Finally, it should be noted that the foregoing embodiments are merely used to describe technical solutions of the present disclosure, rather than to limit the present disclosure. Although the present disclosure is described in detail with reference to the foregoing embodiments, one of ordinary skill in the art should understand that the technical solutions described in the foregoing various embodiments can be modified further, or some technical features in the foregoing various embodiments can be replaced with equivalents, and these modifications or replacements do not cause the essence of the corresponding technical solutions to depart from the spirit and the scope of the technical solutions in the various embodiments of the present disclosure.

What is claimed is:

1. A charging control method, applicable to a cleaning robot, wherein the method comprises:
   detecting a charging status of the cleaning robot;
   locking a drive wheel of the cleaning robot in response to detecting that the cleaning robot is being charged;
   unlocking the drive wheel of the cleaning robot in response to detecting an unlocking trigger operation, wherein the unlocking trigger operation comprises one of following:
   rotation of the drive wheel of the cleaning robot under action of an external force,
   charging of the cleaning robot completing, and
   an instruction received by the cleaning robot and used to start a cleaning mode;
   wherein the method further comprises:
   determining whether the charging of the cleaning robot is completed in response to the unlocking of the drive wheel;

docking the cleaning robot into a charging dock in response to that the charging of the cleaning robot is not completed, locking the drive wheel in response to detecting that the cleaning robot is being charged; and waiting to receive an instruction, or performing an instruction received before and used to start the cleaning mode, in response to detecting that the charging of the cleaning robot is completed.

2. The method according to claim 1, further comprising:

monitoring a status of the drive wheel of the cleaning robot; and determining that the unlocking trigger operation is detected in response to detecting the rotation of the drive wheel of the cleaning robot.

3. The method according to claim 1, further comprising:

monitoring a charging process of the cleaning robot; and determining that the unlocking trigger operation is detected in response to detecting that the charging of the cleaning robot is completed.

4. The method according to claim 1, further comprising:

monitoring an instruction received by the cleaning robot; and determining that the unlocking trigger operation is detected, in response to detecting that the cleaning robot receives the instruction to start a cleaning mode.

5. A cleaning robot, comprising a memory, a processor, and a computer program that is stored in the memory and that is executable by the processor, wherein when the program is executed by the processor, cause the processor to configured to:

detect a charging status of a cleaning robot;

lock a drive wheel of the cleaning robot in response to detecting that the cleaning robot is being charged;

unlock the drive wheel of the cleaning robot in response to detecting an unlocking trigger operation, wherein the unlocking trigger operation comprises one of following:

rotation of the drive wheel of the cleaning robot under action of an external force, charging of the cleaning robot completing, and an instruction received by the cleaning robot and used to start a cleaning mode;

wherein the processor is further configured to:

determine whether the charging of the cleaning robot is completed in response to the unlocking of the drive wheel;

dock the cleaning robot into a charging dock in response to that the charging of the cleaning robot is not completed, lock the drive wheel in response to detecting that the cleaning robot is being charged; and wait to receive an instruction, or perform an instruction received before and used to start the cleaning mode, in response to detecting that the charging of the cleaning robot is completed.

6. The cleaning robot according to claim 5, wherein the processor is further configured to:

monitor a status of the drive wheel of the cleaning robot; and determine that the unlocking trigger operation is detected in response to detecting the rotation of the drive wheel of the cleaning robot.

7. The cleaning robot according to claim 5, wherein the processor is further configured to:

monitor a charging process of the cleaning robot; and determine that the unlocking trigger operation is detected in response to detecting that the charging of the cleaning robot is completed.

8. The cleaning robot according to claim 5, wherein the processor is further configured to:

monitor an instruction received by the cleaning robot; and determine that the unlocking trigger operation is detected, in response to detecting that the cleaning robot receives the instruction to start the cleaning mode.

9. A non-transitory computer-readable storage medium, wherein the non-transitory computer-readable storage medium stores a computer program, and when the computer program is executed by a processor, cause the processor to configured to:

detect a charging status of a cleaning robot;

lock a drive wheel of the cleaning robot in response to detecting that the cleaning robot is being charged;

unlock the drive wheel of the cleaning robot in response to detecting an unlocking trigger operation, wherein the unlocking trigger operation comprises one of following:

rotation of the drive wheel of the cleaning robot under action of an external force, charging of the cleaning robot completing, and an instruction received by the cleaning robot and used to start a cleaning mode;

wherein the processor is further configured to:

determine whether the charging of the cleaning robot is completed in response to the unlocking of the drive wheel;

dock the cleaning robot into a charging dock in response to that the charging of the cleaning robot is not completed, lock the drive wheel in response to detecting that the cleaning robot is being charged; and wait to receive an instruction, or perform an instruction received before and used to start the cleaning mode, in response to detecting that the charging of the cleaning robot is completed.

10. The non-transitory computer-readable storage medium according to claim 9, wherein the processor is further configured to:

monitor a status of the drive wheel of the cleaning robot; and determine that the unlocking trigger operation is detected in response to detecting the rotation of the drive wheel of the cleaning robot.

11. The non-transitory computer-readable storage medium according to claim 9, wherein the processor is further configured to:

monitor a charging process of the cleaning robot; and determine that the unlocking trigger operation is detected in response to detecting that the charging of the cleaning robot is completed.

12. The non-transitory computer-readable storage medium according to claim 9, wherein the processor is further configured to:

monitor an instruction received by the cleaning robot; and determine that the unlocking trigger operation is detected, in response to detecting that the cleaning robot receives the instruction to start the cleaning mode.

* * * * *